(12) United States Patent
Gupte et al.

(10) Patent No.: US 10,701,137 B2
(45) Date of Patent: Jun. 30, 2020

(54) EXCHANGE SERVICE MANAGEMENT CONTENTS WITH A CLOUD ENTITY VIA A SELF-CONTAINED CLOUD CONTENT PACKAGE

(71) Applicant: Hewlett Packard Enterprise Development LP, Houston, TX (US)

(72) Inventors: Prashant Gupte, Sunnyvale, CA (US); Stephane Herman Maes, Fremont, CA (US); Bikash Ranjan Praharaj, Bangalore (IN)

(73) Assignee: MICRO FOCUS LLC, Santa Clara, CA (US)

( * ) Notice: Subject to any disclaimer, the term of this patent is extended or adjusted under 35 U.S.C. 154(b) by 278 days.

(21) Appl. No.: 15/282,355

(22) Filed: Sep. 30, 2016

(65) Prior Publication Data
US 2018/0097706 A1 Apr. 5, 2018

(51) Int. Cl.
*H04L 29/08* (2006.01)
*H04L 12/24* (2006.01)
*H04L 12/26* (2006.01)

(52) U.S. Cl.
CPC .......... *H04L 67/10* (2013.01); *H04L 41/5054* (2013.01); *H04L 43/50* (2013.01)

(58) Field of Classification Search
CPC ..... H04L 41/50; H04L 41/0803; H04L 41/20; H04L 43/50; H04L 67/10; H04L 41/5054
USPC ........................................................ 709/220
See application file for complete search history.

(56) References Cited

U.S. PATENT DOCUMENTS

| 8,813,174 | B1* | 8/2014 | Koeten | H04L 67/10 726/1 |
| 9,886,254 | B2* | 2/2018 | Vedula | G06F 8/60 |
| 2011/0138050 | A1* | 6/2011 | Dawson | G06F 9/5072 709/226 |
| 2012/0030672 | A1* | 2/2012 | Zygmuntowicz | G06F 8/60 718/1 |
| 2012/0266156 | A1* | 10/2012 | Spivak | G06F 9/5055 717/172 |
| 2014/0075565 | A1* | 3/2014 | Srinivasan | G06Q 10/06315 726/26 |
| 2014/0082131 | A1* | 3/2014 | Jagtap | G06F 9/5072 709/217 |
| 2014/0082156 | A1* | 3/2014 | Jagtap | G06F 9/5027 709/220 |

(Continued)

FOREIGN PATENT DOCUMENTS

WO   WO-2015034486   3/2015

*Primary Examiner* — David P Zarka

(57) ABSTRACT

This disclosure relates to a method, system, and medium to exchange service management contents with a cloud entity via a self-contained cloud content package. The device retrieves a plurality of service management contents for a first cloud controller that offers a cloud service. Also, the device generates a self-contained cloud content package including a plurality of service management contents and a plurality of associated dependencies and configurations. The self-contained cloud content package includes elements for provisioning and managing the cloud service offered by the first cloud controller. Moreover, the device exchanges the plurality of service management contents with a second cloud controller in a cloud entity to support the second cloud controller to deploy and manage the cloud service.

20 Claims, 13 Drawing Sheets

(56) References Cited

U.S. PATENT DOCUMENTS

| | | | |
|---|---|---|---|
| 2015/0074279 A1* | 3/2015 | Maes | G06F 9/5072 |
| | | | 709/226 |
| 2015/0081117 A1* | 3/2015 | Romney | A01G 25/165 |
| | | | 700/284 |
| 2015/0120000 A1* | 4/2015 | Coffey | H04L 12/2803 |
| | | | 700/13 |
| 2015/0180734 A1* | 6/2015 | Maes | G06F 9/5072 |
| | | | 709/226 |
| 2015/0304231 A1 | 10/2015 | Gupte et al. | |
| 2016/0012251 A1* | 1/2016 | Singh | G06F 21/6254 |
| | | | 707/783 |
| 2016/0125489 A1 | 5/2016 | Gupte et al. | |
| 2016/0191342 A1* | 6/2016 | Kannan | H04L 41/5025 |
| | | | 709/226 |
| 2016/0196124 A1* | 7/2016 | Vedula | G06F 8/60 |
| | | | 717/177 |
| 2016/0212020 A1 | 7/2016 | Gupte et al. | |
| 2016/0217403 A1 | 7/2016 | Gupte et al. | |
| 2016/0218938 A1 | 7/2016 | Gupte et al. | |
| 2016/0219097 A1 | 7/2016 | Gupte et al. | |
| 2016/0241446 A1* | 8/2016 | Gupte | H04L 41/20 |
| 2016/0254968 A1* | 9/2016 | Ebtekar | H04L 67/10 |
| | | | 709/223 |
| 2016/0309037 A1* | 10/2016 | Rosenberg | H04L 65/403 |
| 2017/0104826 A1* | 4/2017 | Sait | G05B 19/41855 |
| 2017/0124340 A1* | 5/2017 | Chiu | H04L 67/10 |
| 2017/0171033 A1* | 6/2017 | Lucas | H04L 41/145 |
| 2017/0171034 A1* | 6/2017 | Lucas | G06F 3/0482 |
| 2017/0264495 A1* | 9/2017 | Liu | H04L 12/4633 |
| 2018/0011775 A1* | 1/2018 | Baines | G06F 11/3664 |

\* cited by examiner

EXCHANGE SERVICE MANAGEMENT CONTENTS WITH A CLOUD ENTITY VIA A SELF-CONTAINED CLOUD CONTENT PACKAGE

BACKGROUND

A cloud controller can provide user interface (UI) and application programming interface (API) for self-service searching or browsing of a cloud service catalog, and for ordering cloud services from the cloud service catalog. These result into provisioning of the cloud services on the selected infrastructure and maintenance management as specified by the service design, options, or associated policies. It may also provide for policy-guided provisioning of the cloud services and subsequent management, such that users can manage their subscriptions and see monitoring information and perform remediation of any issues via the UI or API. Moreover, the cloud controller may provide orchestration of the service offerings, fulfillment using various cloud providers, and a platform to create or edit service contents (e.g., service designs, meta data, etc.) for the service offerings. However, the service contents generally have various dependencies, and thus are not transportable across different cloud controller instances on different platforms.

BRIEF DESCRIPTION OF THE DRAWINGS

The following detailed description references the drawings, wherein.

DETAILED DESCRIPTION

The solution described herein may use a cloud content package to allow self-contained service management contents to be shared and redistributed across different instances of cloud management platforms and devices. The platform tools can capture inherent and explicit dependencies of the service contents, including but not limited to, platform dependencies, provider dependencies, etc., and encapsulates such dependencies in a self-contained cloud content package.

Overview

Figure 1:
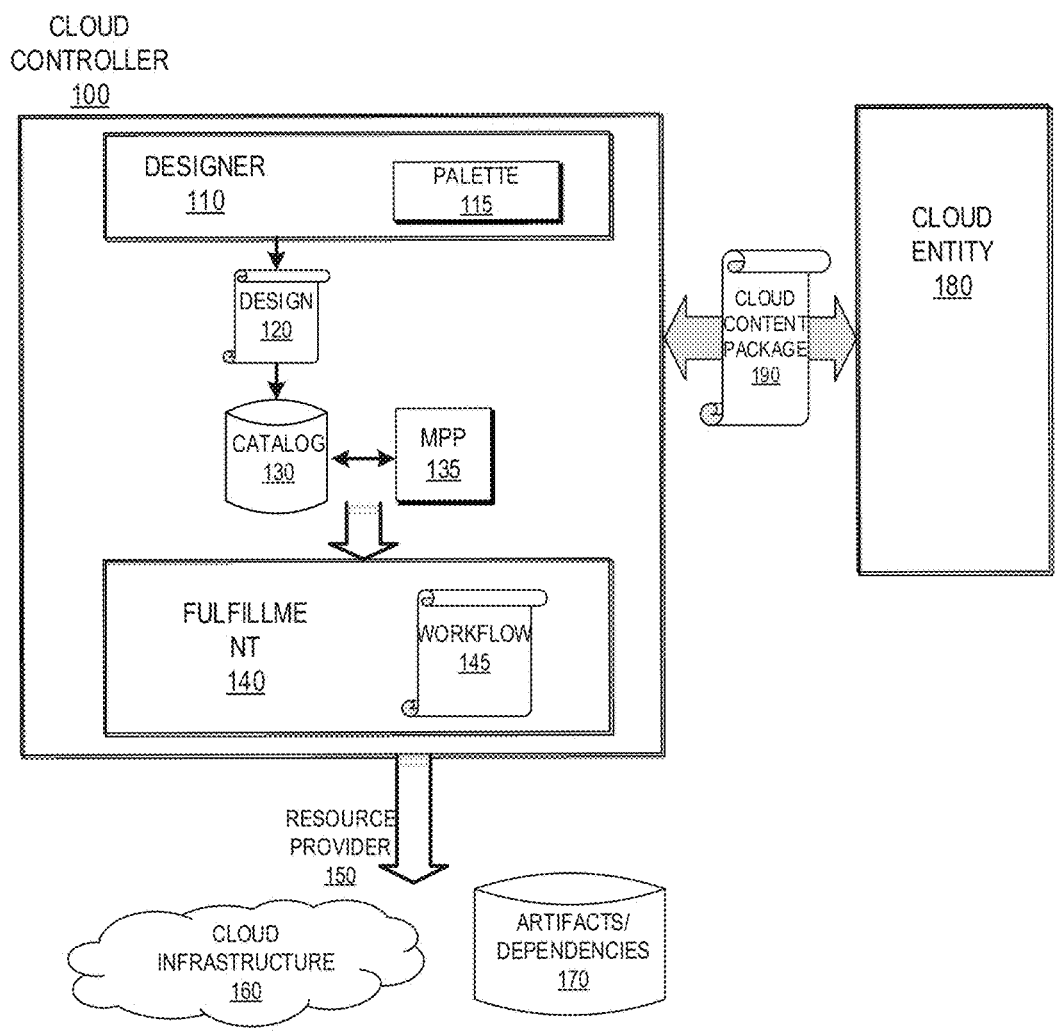
FIG. 1 is a block diagram of an example architecture of a cloud controller to exchange a plurality of service management contents with a cloud entity via a self-contained cloud content package.

FIG. 1 is a block diagram of an example architecture of a cloud controller 100 to exchange a plurality of service management contents with a cloud entity via a self-contained cloud content package 190. Cloud controller 100 may include, for example, a designer 110, a catalog 130, a marketplace portal (MPP) 135, and a fulfillment layer 140. In other examples, cloud controller 100 may include a subset of the above components.

Cloud controller 100 generally refers to a cloud management system that automatically deploys and manages cloud services. An example implementation of cloud controller 100 may be an instance of HPE™ cloud service automation (CSA) platform, an instance of VMWare™ vRealize Suite, or an instance of OpenStack™ Murano platform. Cloud controller 100 may have software components and hardware components that allow for creation of cloud service designs (e.g., design 120) by generating blueprints using different building blocks. Specifically, in the example illustrated in FIG. 1, designer 110 includes a palette 115, which includes multiple building blocks. For example, the building blocks may include a logic block to create a database, a logic block to create a server, a logic block to create a cluster of servers, etc.

A cloud developer can select a plurality of building blocks from palette 115 to create a design 120. Design 120 generally refers to a blueprint of a particular cloud service that is offered to cloud consumers. Designer 120 can be implemented in many different ways. For example, in the HPE CSA platform, designer 120 can be implemented using sequential workflows of tasks that need to be done, or topologies that characterize the architecture and relationship within a service. A plurality of designs created by multiple cloud developers can be included in a catalog 134. Catalog 130 generally refers to an aggregated set of cloud service offerings created based on the designs, whereas the cloud service offerings are grouped logically together. Moreover, catalog 130 may also include meta data that creates offerings, such as, price, entitlement, role-based access, policies, options, bundles, etc.

In some examples, catalog 130 can then be displayed in a marketplace portal (MPP) 135 and made accessible to the cloud consumers. MPP 135 generally refers to a portal that authenticates users to view, select, download, and install cloud services from their corresponding catalogs. In other examples, catalog 130 also can be accessed via APIs.

Hence, a user can log in the marketplace portal 135 to browse a plurality of cloud services in different catalogs, and select a particular cloud service from a catalog 130. Here, cloud controller 100 can support multiple users. For example, a first user belonging to the Research & Development (R&D) department of an organization may log on marketplace portal (MPP) 135 to view a first subset of cloud service offerings in a first catalog that is related his/her user role or profile. The first user in R&D department may select a cloud service for "creating a network" from the catalog displayed to him/her. However, a second user belonging to the Marketing department of the organization may log on marketplace portal (MPP) 135 to view a second subset of cloud service offerings in a different catalog that is related to his/her user role or profile. Thus, the cloud service for "creating a network" may not be visible to the second user.

After a user selects a cloud service from catalog 130 through MPP 135, the process is directed to a fulfillment layer 140. Fulfillment layer 140 is deployed with workflows 145 for various cloud services. Furthermore, fulfillment layer 140 can work with different resource providers 150 over a cloud infrastructure 160 to fulfill a particular resource for the cloud service. In some examples, when a user selects a cloud service, fulfillment layer 140 may connect to a public cloud provider to fulfill the resource requirements for the selected cloud service. In other examples, when a user selects a cloud service, fulfillment layer 140 may connect to a private data center resource provider.

Also, fulfillment layer 140 may be configured with the correct artifacts and/or dependencies 170 to ensure that the resource provided by resource provider 150 executes successfully on cloud controller 100. Artifacts/dependencies 170 generally include various dependencies from a provider to another provider, from an artifact to another artifact, from a provider to an artifact, and vice versa. Dependencies may be, for example, a specific version of a resource provider, a specific platform (e.g., Windows, Linux, etc.) for a database system, a template for a specification, etc.

Moreover, cloud service contents and dependencies can be packaged into a cloud content package 190. Cloud controller 100 can exchange cloud management contents with another cloud entity, such as, cloud entity 180, via cloud content package 190. Cloud content package 190 can be defined to include a number of different components, for example, a header component, a documentation component, a definition block of materials (BOM), a platform dependency component, a provider dependency component, etc. Note that cloud content package 190 includes self-contained service management contents. Therefore, once generated, an instance of cloud content package 190 can be portable to multiple different instances of cloud management platforms and devices. Moreover, cloud controller 100 can be adapted to generate, load, and/or use cloud content package 190 in an automated process. The definition and generation process of cloud content package 190 are explained in details in the sections below.

Figure 2:
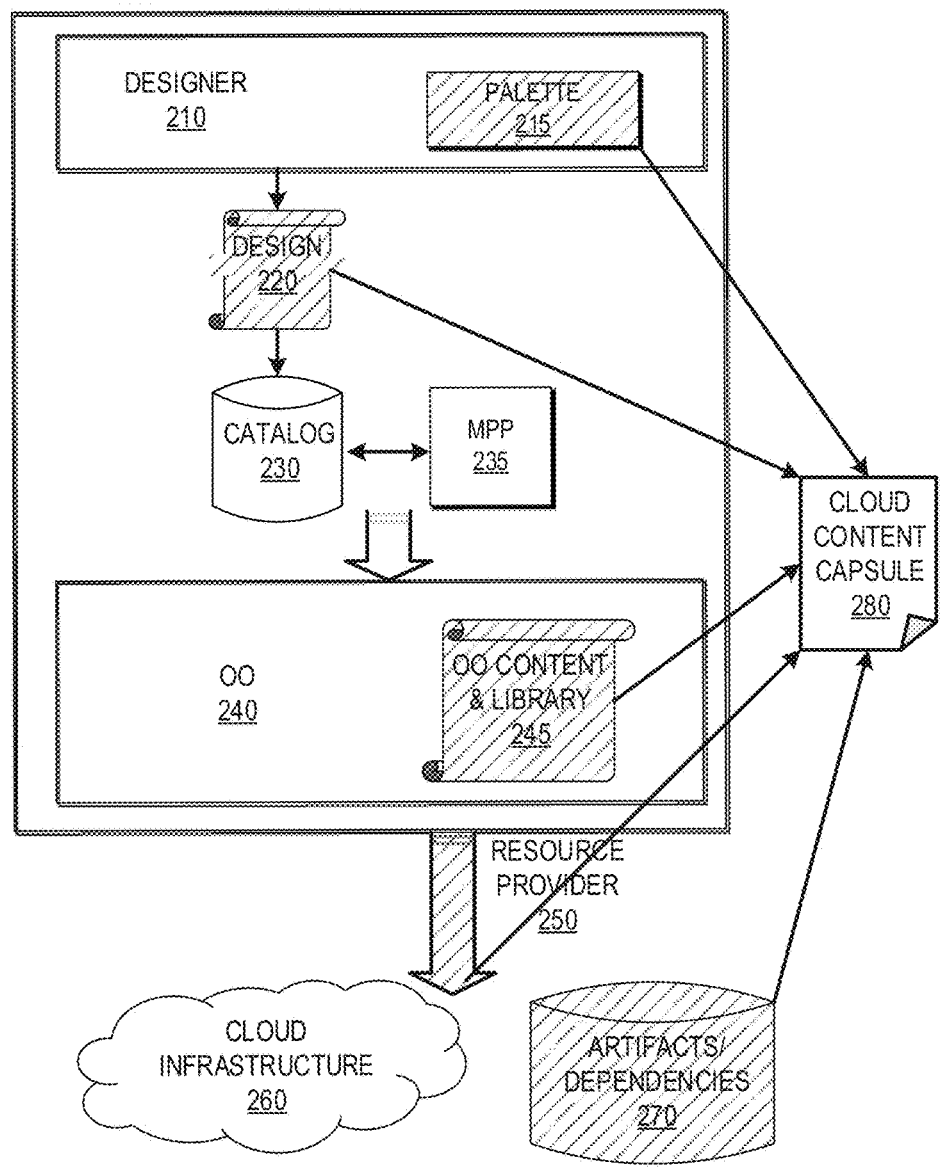
FIG. 2 is a block diagram of an example architecture of a cloud service automation (CSA) platform to exchange a plurality of service management contents with a cloud entity via a self-contained cloud content package.

FIG. 2 is a block diagram of an example architecture of a cloud service automation (CSA) platform 200 capable of exchanging a plurality of service contents with a cloud entity via a cloud content package. CSA platform 200 may be an intelligent automation platform for building, managing, and securing cloud services. It can provide an end-to-end solution spanning from resource management, service delivery and management, and cloud services consumption across hybrid IT environment, which includes physical, virtual, and/or cloud environment. CSA platform 200 includes a designer 210, marketplace portal 235 that is coupled to a catalog 230, and an operation orchestration (OO) component 240. Designer 210 includes a palette 215, which includes multiple building blocks for creating a design 220. Design 220 can then be included in catalog 230. Catalog 230 includes a plurality of cloud service offerings, which are displayed in marketplace portal (MPP) 235. MPP 235 is accessible to users such that a user can log in to browse the plurality of cloud services in different catalogs, and select a particular cloud service from a catalog.

After the user selects a particular cloud service from catalog 230 through MPP 235, the process is directed to an operations orchestration (OO) component 240. OO component 240 includes an OO content and library 245 for various cloud services. Furthermore, OO component 240 can work with different resource providers 250 over a cloud infrastructure 260 to fulfill a resource for the particular cloud service. Also, OO component 240 is configured with the correct artifacts and/or dependencies 270 to ensure that the resource provided by resource provider 250 runs successfully on CSA platform 200.

Moreover, a portable cloud content capsule 280 can be created to archive content pieces and their dependencies. For example, capsule 280 may include design building blocks from palette 215, designs 220 that are offered through catalog 230 on marketplace portal 235, OO flows stored in OO content and library 245, provider dependencies on various resource providers 250, other artifacts and/or dependencies 270, etc. In some examples, cloud content capsule 280 can be in the form of a compressed file, e.g., a ZIP file. When cloud content capsule 280 is installed on a second instance of CSA platform 200, the compressed file will be unzipped, and different elements of cloud content capsule 280 will be installed and/or stored on different components of the second instance of CSA platform 200. For example, the designs from capsule 280 may be stored in palette 215 of the second instance of CSA platform 200; the OO flows will be stored in OO content and library component 245 of the second instance of CSA platform 200; the provider dependencies will be installed properly to work with resource provider 250; the artifacts/dependencies will be stored with artifacts/dependencies component 270 of the second instance of CSA platform 200; etc.

In some examples, the dependencies may occur due to different configurations in the settings or options of the platforms and artifacts. In such cases, the specific configuration of the platform settings or options can be saved, e.g., in a configuration script file. When cloud content capsule 280 is installed on the second instance of CSA platform 200, the configuration script file will be automatically executed to set the platform settings or options to the proper values.

Cloud Content Capsule

Figure 3:
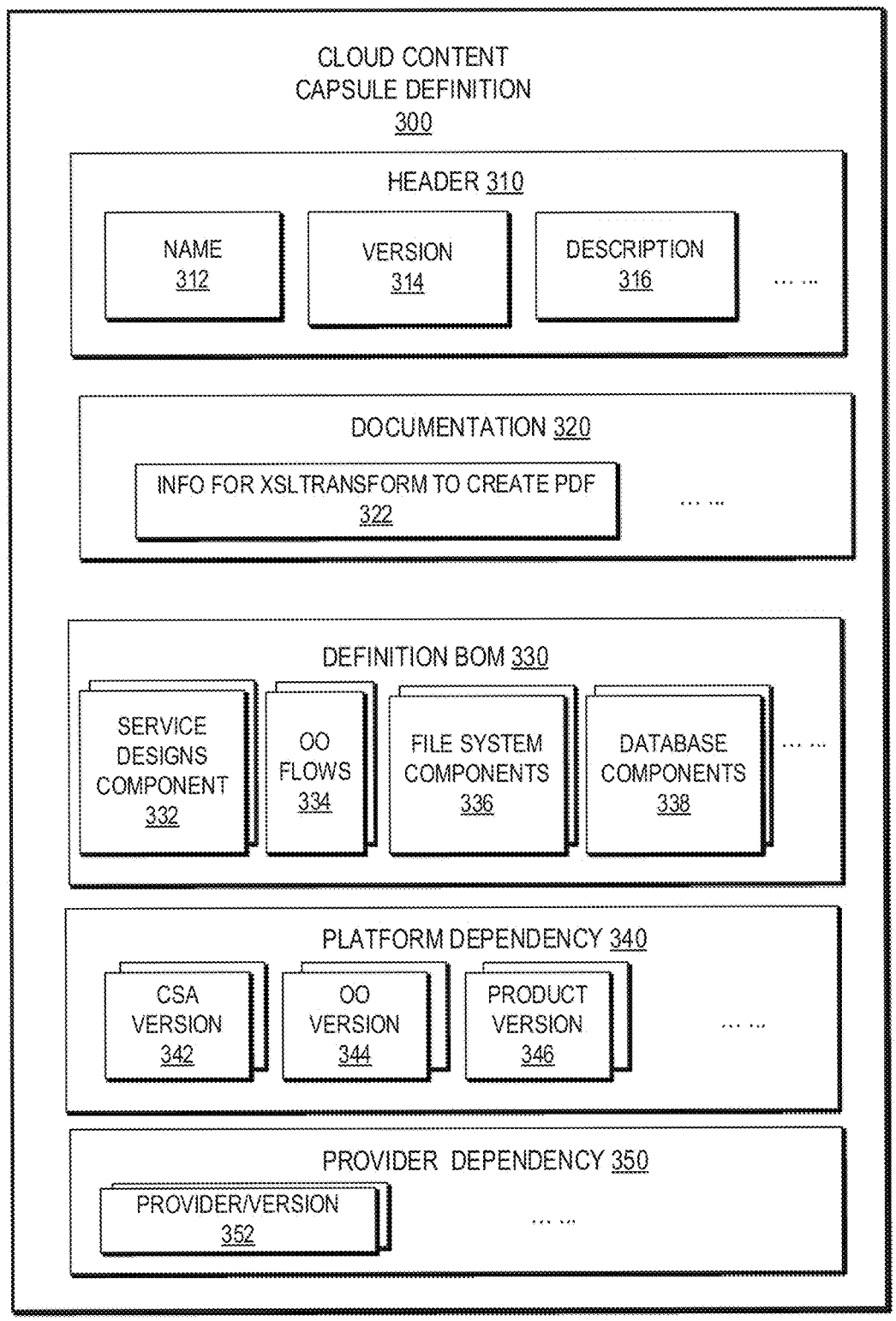
FIG. 3 is a block diagram of an example definition of a self-contained cloud content package.

FIG. 3 is a block diagram of an example definition of a cloud content package. The terms "cloud content package" and "cloud content capsule" are used interchangeably throughout this disclosure. A cloud content capsule definition 300 generally includes five different components, namely, a header component 310, a documentation component 320, a definition block of materials (BOM) 330, a platform dependency component 340, and a provider dependency component 350.

A. Header

Header 310 generally includes a description of a cloud content capsule for identification of the cloud content capsule. For example, header 310 can include, but is not limited to, a unique name 312 of the cloud content capsule, a version 314 of the cloud content capsule, a plain description 316 that describes the cloud contents included within the cloud content capsule, etc.

B. Documentation

When a developer develops a cloud service and packages it in a cloud content capsule, the developer also needs to provide documentation for consumers of the cloud services. Thus, documentation 320 generally includes any text that is related to the cloud content package as provided by the developer. For example, the text may provide information for Extensible Stylesheet Language (XSL) transformation 322. A stylesheet engine can take the input of the text and style information, and automatically create a Portable Document Format (PDF) file to provide to the consumer of the cloud service.

C. Definition BOM

A definition block of materials (BOM) 330 generally refers to blueprints of a cloud service. For example, definition BOM 330 may include a plurality of service designs components 332, a plurality of operations orchestration (OO) flows 334, a plurality of file system components 336, a plurality of database components 338, etc.

Cloud service designs components 332 may include cloud service offerings in a catalog created by cloud service developers. The cloud service offering catalog may include, for example, an owner of the cloud service, a targeted audience, and a list of items in the catalog with a high-level description for each item. For every item identified in the catalog, a service offering may identify a number of design specifications, including but not limited to, the name of the service offering, the goal of the service offering, the type of service offering (e.g., IaaS, PaaS, SaaS, etc.), detailed description of the offering, a list of parameters and details for each parameter (e.g., lower value, upper value, type of value, etc.), parameters relationships (e.g., mandatory, optional, related, etc.), a list of resources needed for the service offering, and so on.

Operations Orchestration (OO) component generally helps an organization to manage the automation of IT infrastructure and operations efficiently. OO can be leveraged to reduce cost and improve automation deployment time when automating IT tasks, operations, and processes. OO may provide a stable foundation for IT to deliver services both in a traditional data center and a hybrid cloud environment. Example Operations orchestration (OO) flows 334 include cloud orchestration, security operations, disaster recovery, incident automation, service request fulfillment, service management and monitoring, IP management, etc.

Moreover, file system components 336 can include any number of files in any formats or types. Database components 338 can include various databases, such as, a table, a block of data, etc. The above components of definition BOM 330 collectively describe to the consumer of a cloud service what the cloud service codes do and where components of the cloud service are located.

D. Platform Dependency

Platform dependency 340 generally includes dependencies related to the cloud service automation platform. For example, it may include what version of the CSA that the cloud service runs on (e.g., CSA version 342), what version of Operations Orchestration (OO) to run the cloud service on (e.g., OO version 344), a product version 346, settings and configurations, etc.

E. Provider Dependency

Provider dependency 350 generally specifies what provider products and versions (e.g., provider/version 352) are tested and supported for the cloud service to be deployed successfully. Here, provider/version 352 often includes multiple versions of multiple providers.

Cloud Content Capsule Development

Figure 4:
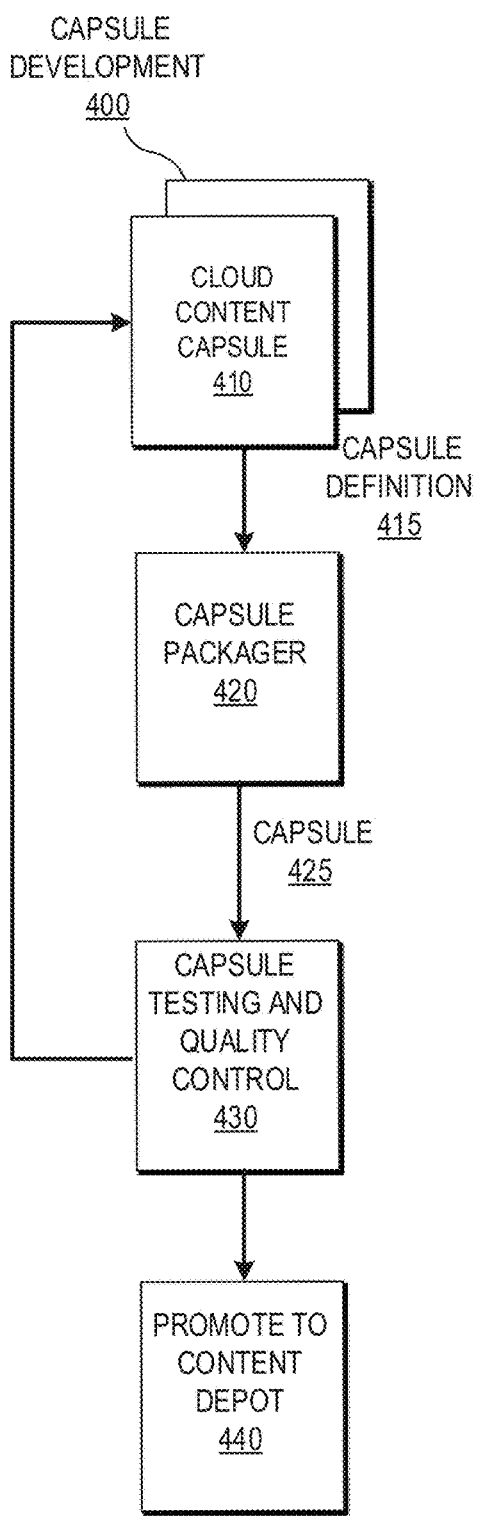
FIG. 4 is a block diagram illustrating example cloud content capsule development.

FIG. 4 is a block diagram illustrating an example cloud content capsule development 400. A cloud developer creates the codes, files, materials, etc., for a cloud service. Such information may be included as part of cloud content capsule 410. The cloud developer may define the cloud content capsule based on these information by providing a capsule definition 415. Capsule definition 415 includes elements described above in relation to FIG. 3, such as, headers, documentations, definition BOMs (service designs, OO flows, file systems, databases, etc.), platform and/or provider dependencies, and so on.

Capsule definition 415 is then passed on to a capsule packager 420. Capsule packager 420 is a component that takes capsule definition 415 as an input and generates an instance of a capsule 425. In some examples, the instance of capsule 425 can be a compressed file. Thereafter, the cloud developer will perform capsule testing and quality control 430 to decide whether and how to revise capsule 425 or its corresponding capsule definition 415. If so, the process will repeat 410-430 until capsule 425 passes the quality control.

Then, capsule 425 is promoted to a content depot 440, allowing consumers to select various cloud service offerings.

Cloud Content Capsule Consumption

Figure 5:
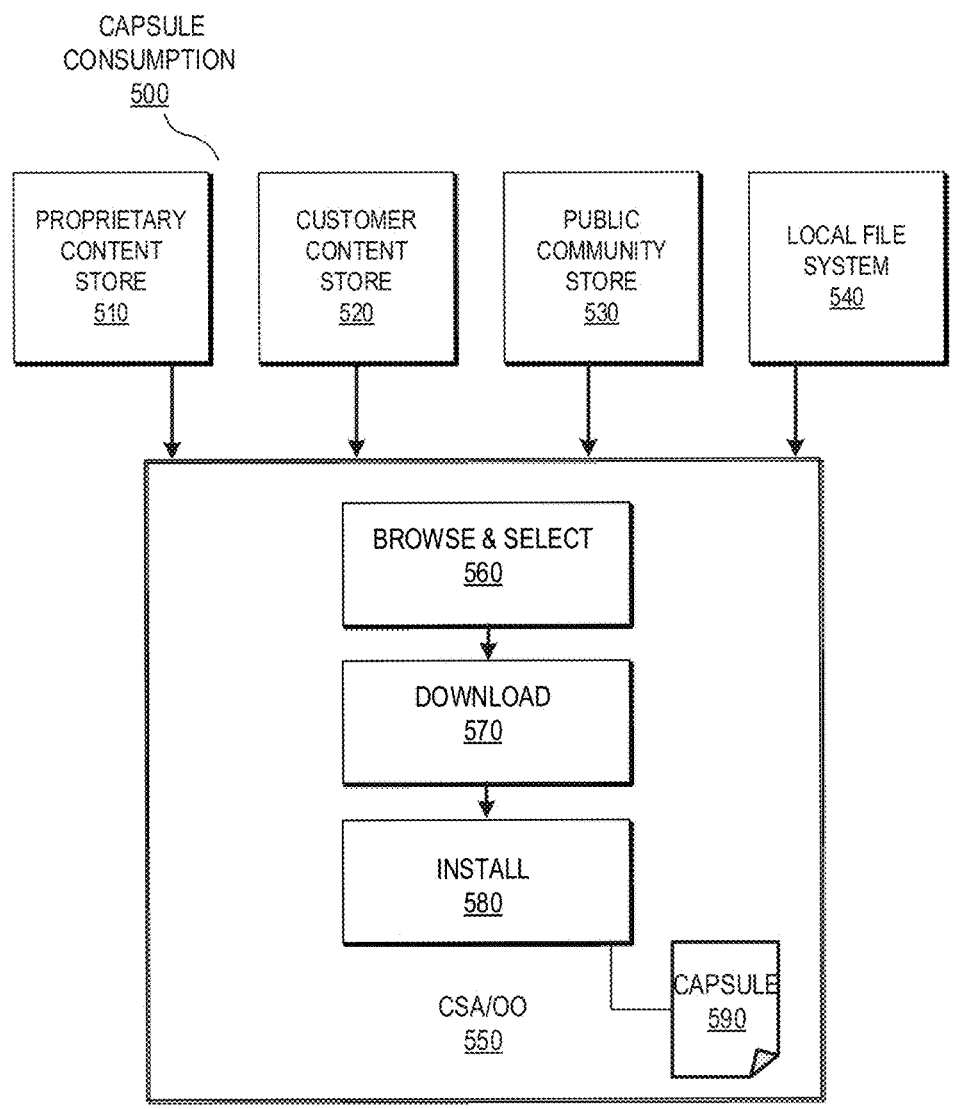
FIG. 5 is a block diagram illustrating example cloud content capsule consumption.

FIG. 5 is a block diagram illustrating example cloud content capsule consumption 500. As mentioned above, capsule 425 can be promoted to a content depot. The content depot can include, but is not limited to, a proprietary content store 510, a customer content store 520, a public community store 530, a local file system 540, etc. An example proprietary content store 510 is HP live network (HPLN) content marketplace, which provides contents and documentations related to software products of Hewlett Packard Enterprise. Similarly, a customer could have a customer content store 520 (e.g., a file transfer protocol (FTP) site), where the cloud developer can store the capsule and use the customer FTP site as a content depot. Public community store 530 can include a public content marketplace, such as, Amazon Web Services (AWS). Any cloud developer in a community (e.g., an open source developer community) can access the public content marketplace and store the capsule there to share with other cloud developers in the community as well as with consumers. Moreover, if a cloud developer works in a closed environment, the cloud developer may store the capsule in a local file system 540 (or a network share). The capsule can then be shared between trusted parties within the local network system. Note that the cloud developer can promote the capsule to multiple content depots at the same time.

CSA/OO 550 refers to an example cloud management and operations orchestration system. CSA/OO 550 can be used by companies and government agencies to automate the management of cloud-based IT-as-a-service, from order, to provision, and retirement. CSA/OO 550 may orchestrate the provisioning and deployment of complex IT services of, e.g., databases, middleware, packaged applications, etc. CSA/OO 550 can be connected to any type of content depots, e.g., proprietary content store 510, customer content store 520, public community store 530, local file system 540, etc. Moreover, CSA/OO 550 can be connected multiple content depots simultaneously. Further, when connecting to multiple content depots, CSA/OO 550 can use different credentials (e.g., username/password) for different content depots.

Upon connecting to the content depots, a user will see multiple capsules as selectable blocks through an interface provided by CSA/OO 550. The user can then browse and select 560 among the multiple capsules. When the user selects a particular capsule, CSA/OO 550 may identify the selected capsule and its corresponding content depot. CSA/OO 550 can then download 570 the selected capsule 590 for the user from the corresponding content depot. Then, CSA/OO 550 may proceed with installing 580 the downloaded capsule 590.

Therefore, from a user's perspective, after a capsule is selected from a content depot, the associated service contents will be automatically downloaded and installed on CSA/OO 550 regardless of the versions, configurations, and platforms of CSA/OO 550. In one example, a selected capsule 590 is downloaded as a compressed file to CSA/OO 550. Capsule 590 may be developed on a different platform having a different configuration from the configuration of CSA/OO 550. However, because all of the platform dependencies are included in capsule 590, when CSA/OO 550 installs the capsule, the missing platform dependencies will be installed or configured on CSA/OO 550 along with the service contents. Moreover, the compressed file will be unzipped, and different types of service contents are installed to different components within CSA/OO 550 automatically. For example, service designs in capsule 590 are automatically included in the design palette on CSA/OO 550; OO flows in capsule 590 are automatically stored in the OO content library; the file system included in capsule 590 is merged with the file system on CSA/OO, database files in capsule 590 are deployed with the existing database system on CSA/OO 550, etc. As such, service contents included in capsule 590 can be portable across multiple cloud entities having different platforms, configurations, and/or resource providers.

Cloud Content Capsule Use Cases

FIGS. 6A-6D are block diagrams illustrating example exchanges of service contents with a cloud entity via a cloud content package.

A. Content Exchange from Marketplace to Cloud Controller

Figure 6A:
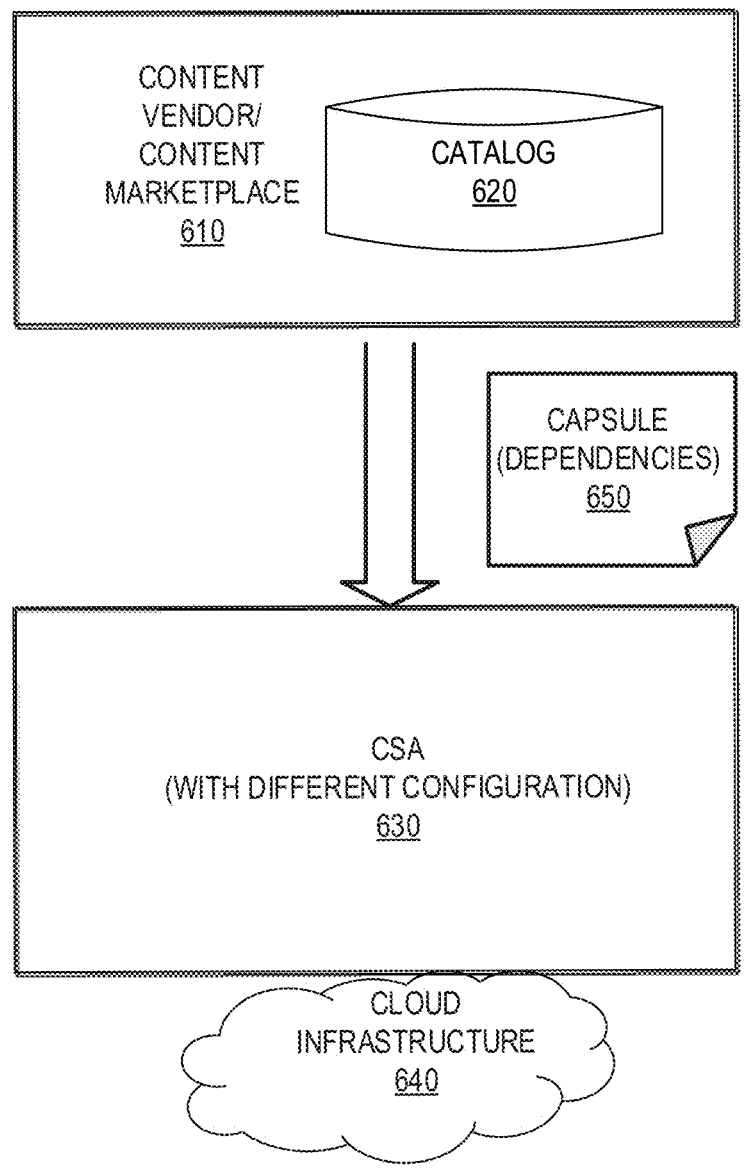
FIGS. 6A-6D are block diagrams illustrating example exchanges of service management contents with a cloud entity via a self-contained cloud content package.

FIG. 6A is a block diagram illustrating an example exchange of service contents with a cloud entity via a cloud content package, for example, a content exchange from a marketplace to a cloud controller. Specifically, FIG. 6A includes a content vendor and/or content marketplace 610 and a cloud controller, such as CSA 630 over a cloud infrastructure 640. As mentioned above, cloud developers generate service contents and package them into cloud content capsules. Then, the cloud content capsules can be made available as a part of catalog 620 in content marketplace 610. Consumers can download a selected capsule (e.g., capsule 650) to an instance of CSA 630. Note that, CSA 630 may have different configurations for consuming the service contents within capsule 650. However, because capsule 650 includes the dependencies and artifacts, when CSA 630 downloads capsule 650 and installs capsule 650, the dependencies will be automatically configured correctly for consuming the service contents within capsule 650.

B. Content Exchange from Service Provider to Reseller

Figure 6B:
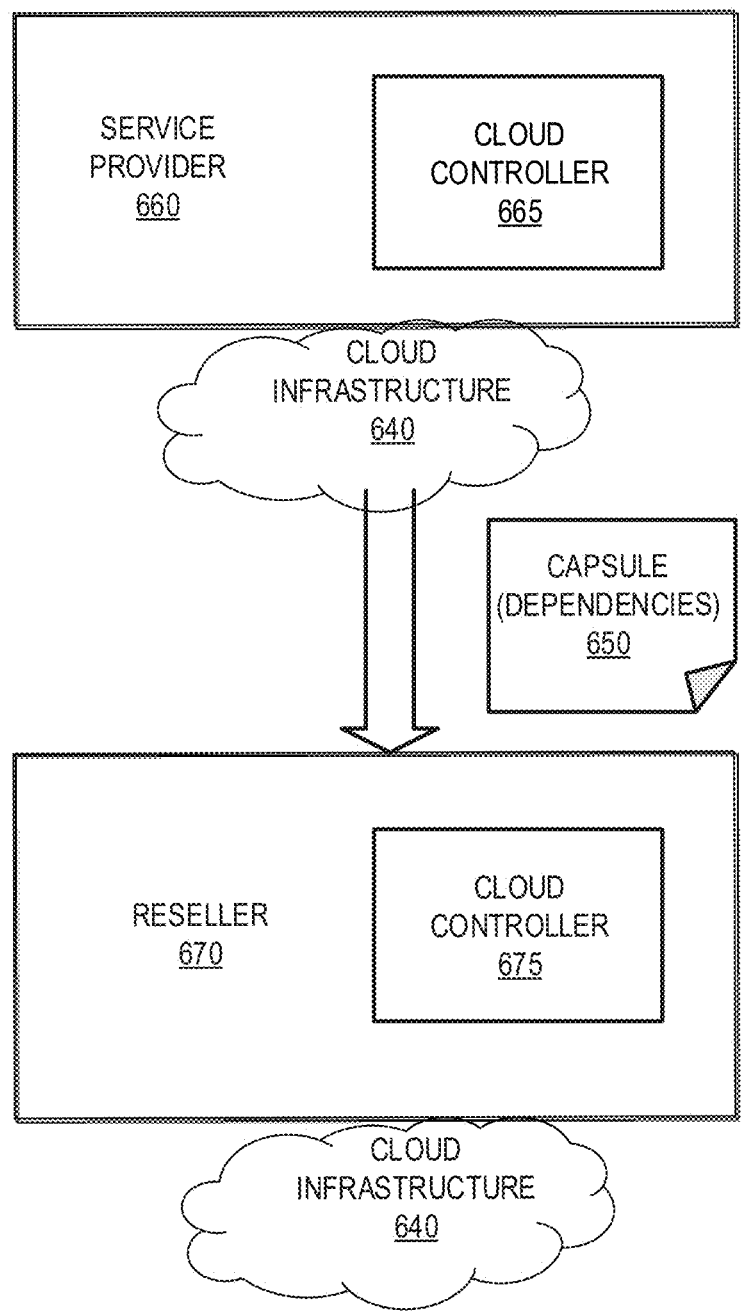

FIG. 6B is a block diagram illustrating an example exchange of service contents with a cloud entity via a cloud content package, for example, a content exchange from a service provider to a cloud service reseller. Specifically, FIG. 6B includes a service provider 660 with a cloud controller 665 deployed over a cloud infrastructure 640, as well as a reseller 670 with a different cloud controller 675 deployed over a cloud infrastructure 640.

In this example, service provider 660 has developed a collection of service contents, and would like to offer to another service provider to either deploy or resell these cloud services to other entities. Note that, cloud controller 675 may have different configurations for consuming the service contents within capsule 650 from the configurations of the cloud controller on which service contents in capsule 650 is developed. The different configurations may cause cloud controller 675 unable to consume the service contents due to missing platform or provider dependencies and/or artifacts. However, because capsule 650 includes the dependencies and artifacts needed for consuming the corresponding service contents, when cloud controller 675 on reseller 670 downloads capsule 650 and installs capsule 650, the dependencies/artifacts will be automatically configured correctly for consuming the service contents within capsule 650.

In another example, instead of consuming the service contents in capsule 650 at reseller 670, reseller 670 can sell the service content in the form of capsule 650 to other cloud consumers. The recipient of the service contents is guaranteed to be able to consume the service contents in capsule 650 regardless of its platform settings, resource provider configurations, etc., because capsule 650 includes a complete set of dependencies for consuming the service contents properly.

C. Content Exchanges Between Service Provider, Aggregator and Reseller

Figure 6C:
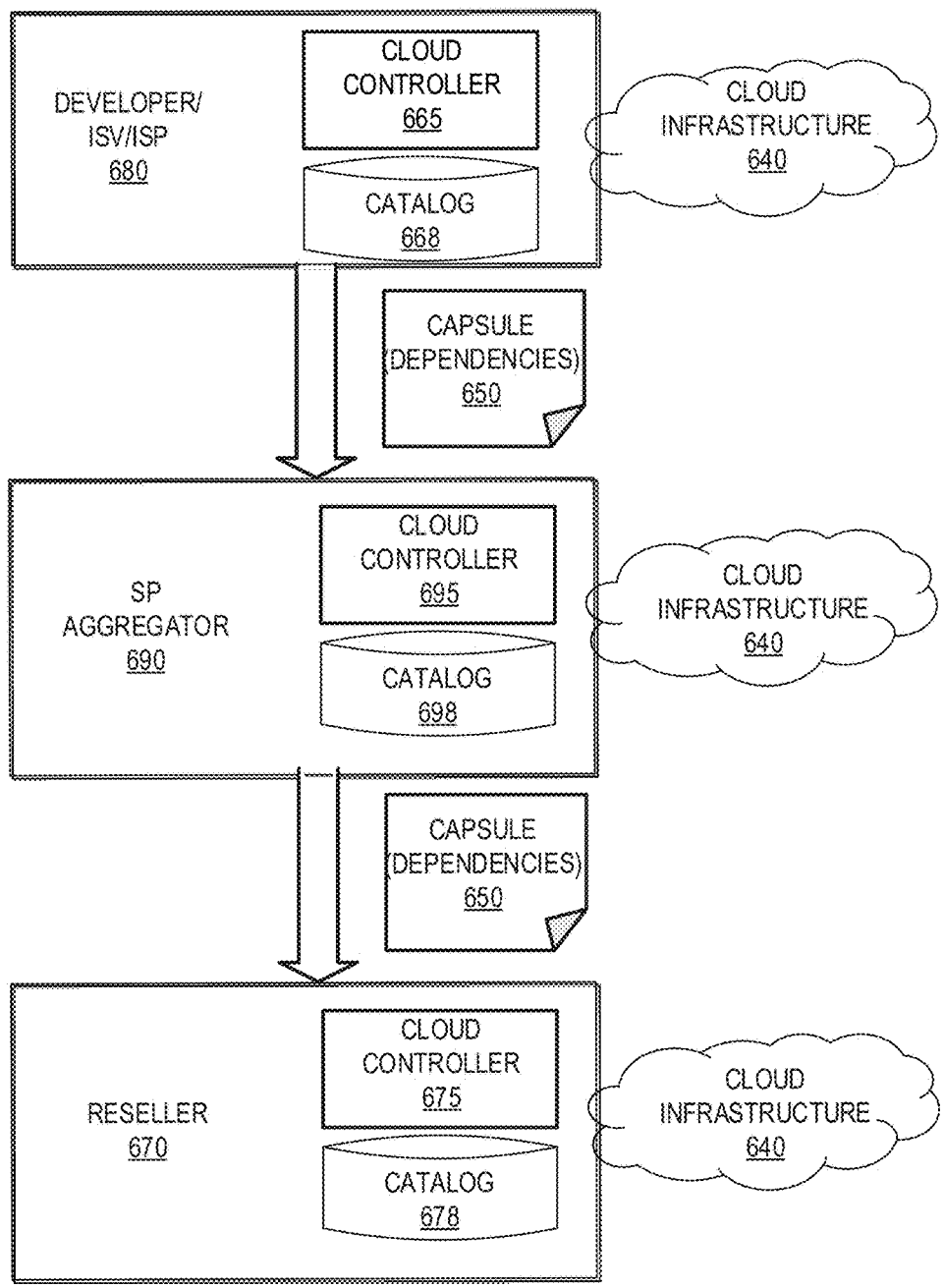

FIG. 6C is a block diagram illustrating an example exchange of service contents with a cloud entity via a cloud content package, for example, a content exchange from a service provider to a cloud service provider aggregator, and then to a cloud service reseller. Specifically, FIG. 6C includes a developer, Internet service vendor (ISV) or Internet service provider (ISP) 680 with a cloud controller 665 deployed over a cloud infrastructure 640, a cloud service provider aggregator 690 with another cloud controller 695 deployed over a cloud infrastructure 640, and a reseller 670 with yet another cloud controller 675 deployed over a cloud infrastructure 640.

Each cloud entity may also have a catalog that includes cloud services offered by that cloud entity. In the example illustrated in FIG. 6C, developer/ISV/ISP 680 includes catalog 668; service provider aggregator 690 includes catalog 698; and reseller 670 includes catalog 678. Service provider aggregator 690 can aggregate cloud service offerings from multiple developers and/or ISPs and sell the aggregated cloud services to different resellers, such as, reseller 670.

Here, cloud controller 695 may have different configurations for consuming the service contents within capsule 650 from the configurations of cloud controller 665 on which service contents in capsule 650 is developed. Likewise, cloud controller 675 may have different configurations for consuming the service contents within capsule 650 from the configurations of both cloud controller 665 on which service contents in capsule 650 is developed and cloud controller 695 from which reseller 670 acquires cloud content capsule 650.

The different configurations may cause either cloud controller 695 or cloud controller 675 unable to consume the service contents due to missing platform or provider dependencies and/or artifacts. However, because capsule 650 includes the dependencies and artifacts for consuming the corresponding service contents, when cloud controller 675 on reseller 670 downloads capsule 650 and installs capsule 650, the dependencies/artifacts will be automatically configured correctly for consuming the service contents within capsule 650. Service provider aggregator 690 may store capsule 650 in its compressed form and sell it to reseller 670. Alternatively, service provider aggregator 690 may deploy and install the service contents of capsule 650 locally at a data center, bundle the service contents from capsule 650 with other service contents, package the bundled service contents in a new capsule with corresponding dependencies, and sell the new capsule to reseller 670. In other words, capsule 650 received by reseller 670 may or may not be the same capsule received by service provider aggregator 690 from developer/ISV/ISP 680. In either scenario, because capsule 650 received by reseller already includes dependencies and artifacts, reseller 670 may be guaranteed to be able to consume the service contents in capsule 650 regardless of its platform settings, resource provider configurations, etc.

This solution may allow developer/ISV/ISP 680 to offer, sell, and deploy service contents it has developed to a chain of cloud entities without worrying about platform and/or configuration differences at different cloud entities. Although three cloud entities are illustrated in FIG. 6C, the solution allows the service contents to be exchanged in the form of a cloud content capsule across an unlimited number of cloud entities, and ensures that each cloud entity in the chain can successfully deploy and consume the service contents.

D. Content Exchange Between Different Instances of Cloud Controllers

Figure 6D:
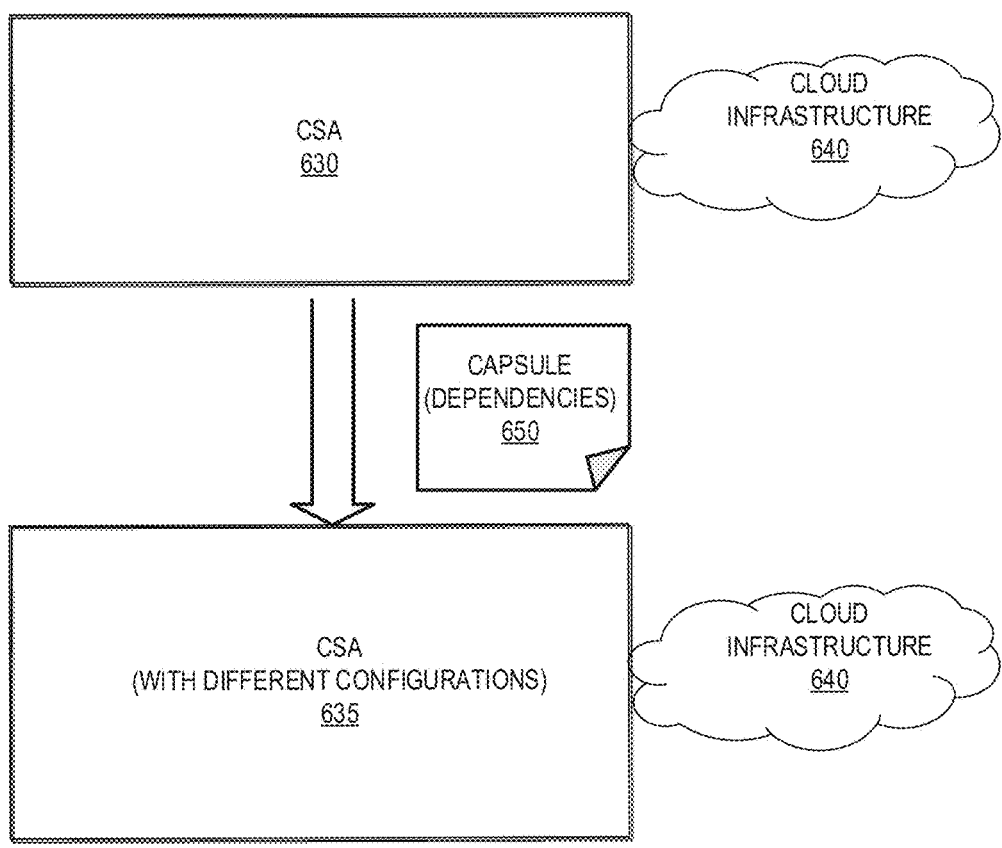

FIG. 6D is a block diagram illustrating an example exchange of service contents with a cloud entity via a cloud content package, for example, a content exchange between two different instances of cloud controllers associated with a developer or ISP. Specifically, FIG. 6D includes a first instance of cloud controller, e.g., CSA 630 deployed over a cloud infrastructure 640, and a second instance of cloud controller, e.g., CSA 635 deployed over cloud infrastructure 640.

In this example, a cloud developer has developed a collection of service contents on the first instance of cloud controller (e.g., CSA 630), and would like to deploy and test these cloud services on another cloud controller (e.g., CSA 635) within the same cloud entity. However, CSA 635 may have different configurations from the configurations of CSA 630. Therefore, CSA 635 may not be able to properly consume the service contents due to misconfiguration of the platform or missing dependencies and/or artifacts. Because capsule 650 now includes a complete set of dependencies and artifacts for consuming the corresponding service contents, when CSA 635 downloads capsule 650 and installs capsule 650, the dependencies/artifacts may be automatically configured correctly for consuming the service contents within capsule 650. Therefore, CSA 635 is guaranteed to be able to consume the service contents within capsule 650.

Figure 7A:
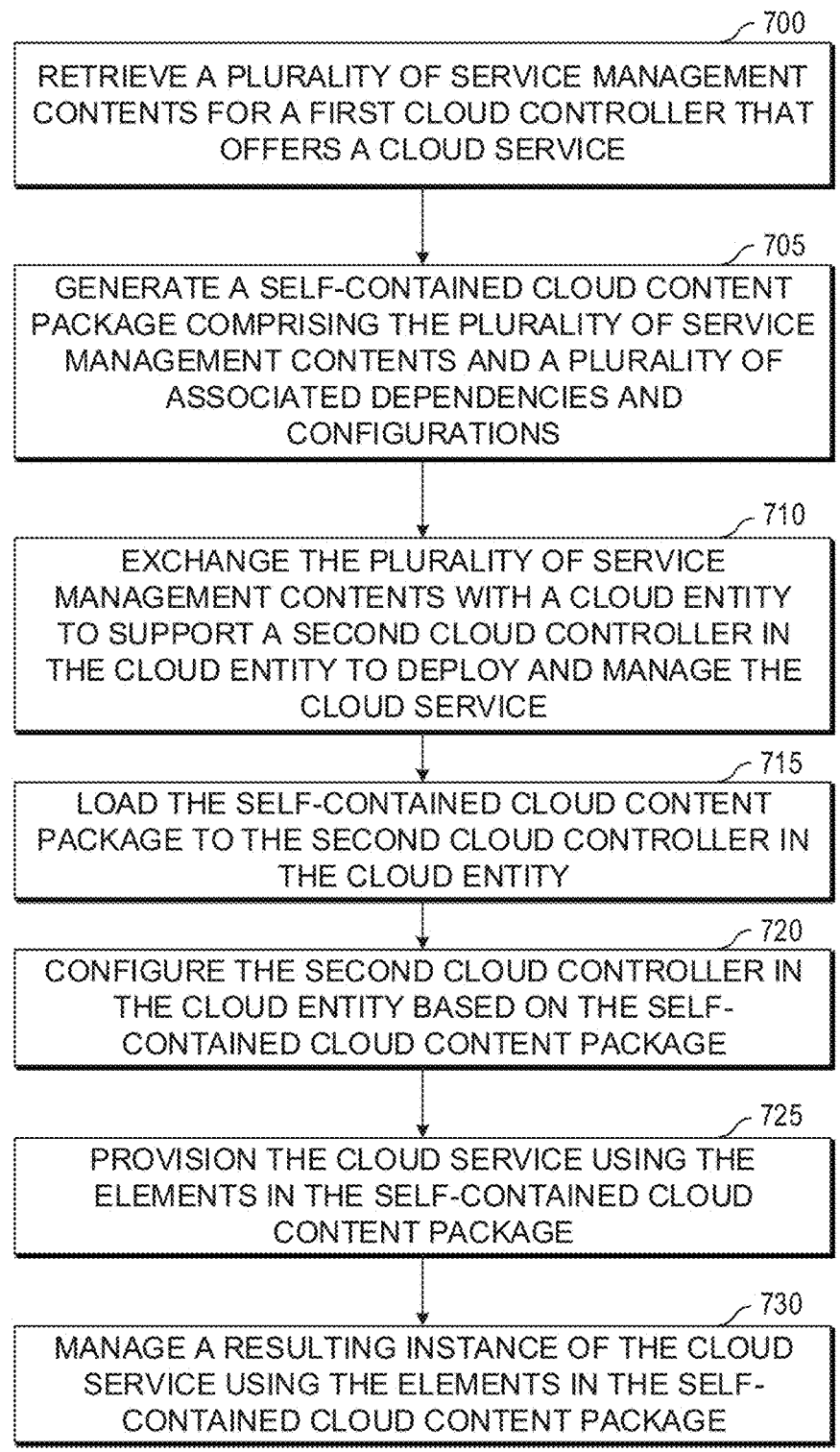
FIGS. 7A-7C are flowcharts of example processes to exchange a plurality of service management contents with a cloud entity via a self-contained cloud content package.
Figure 7B:
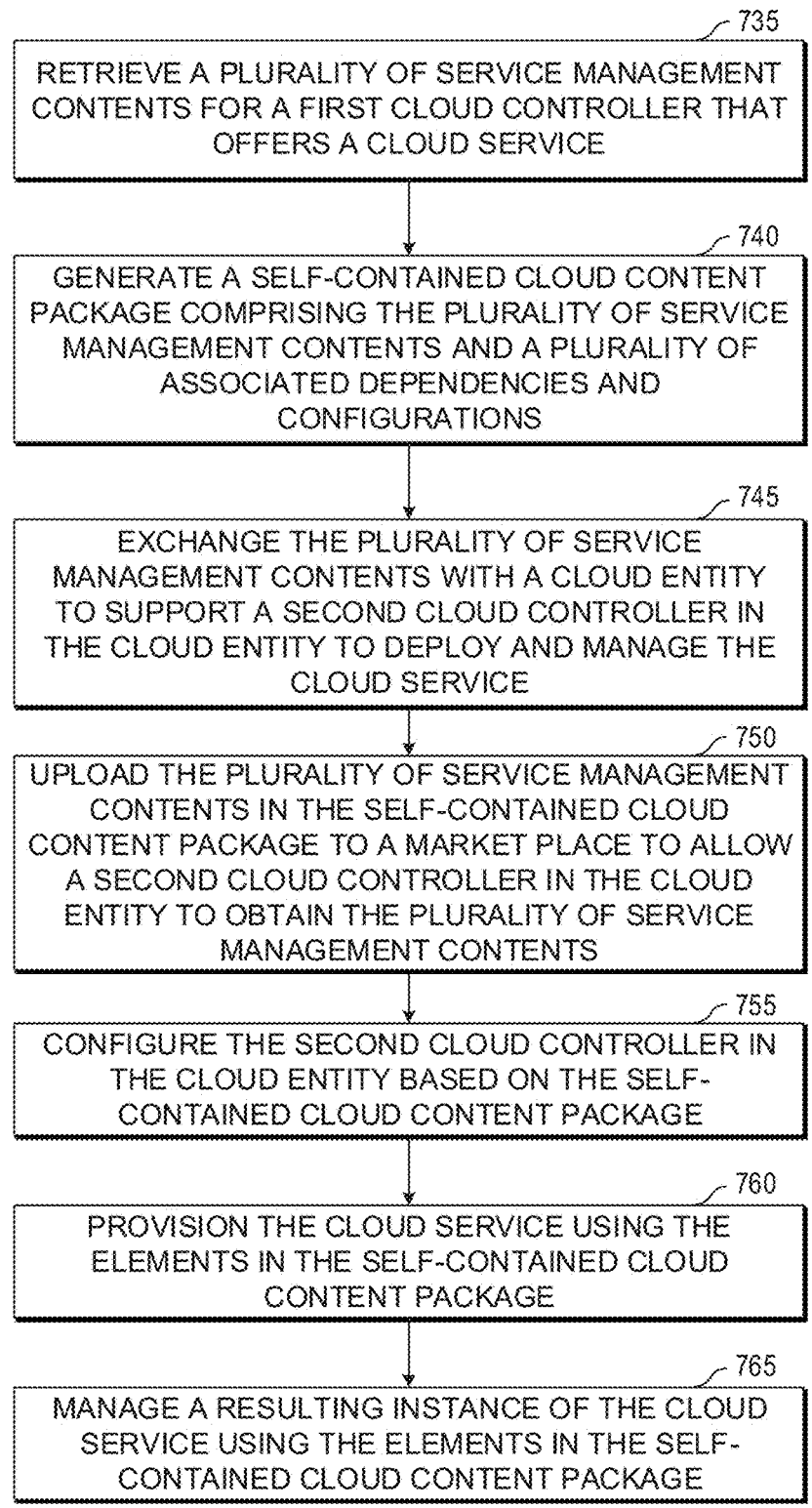
Figure 7C:
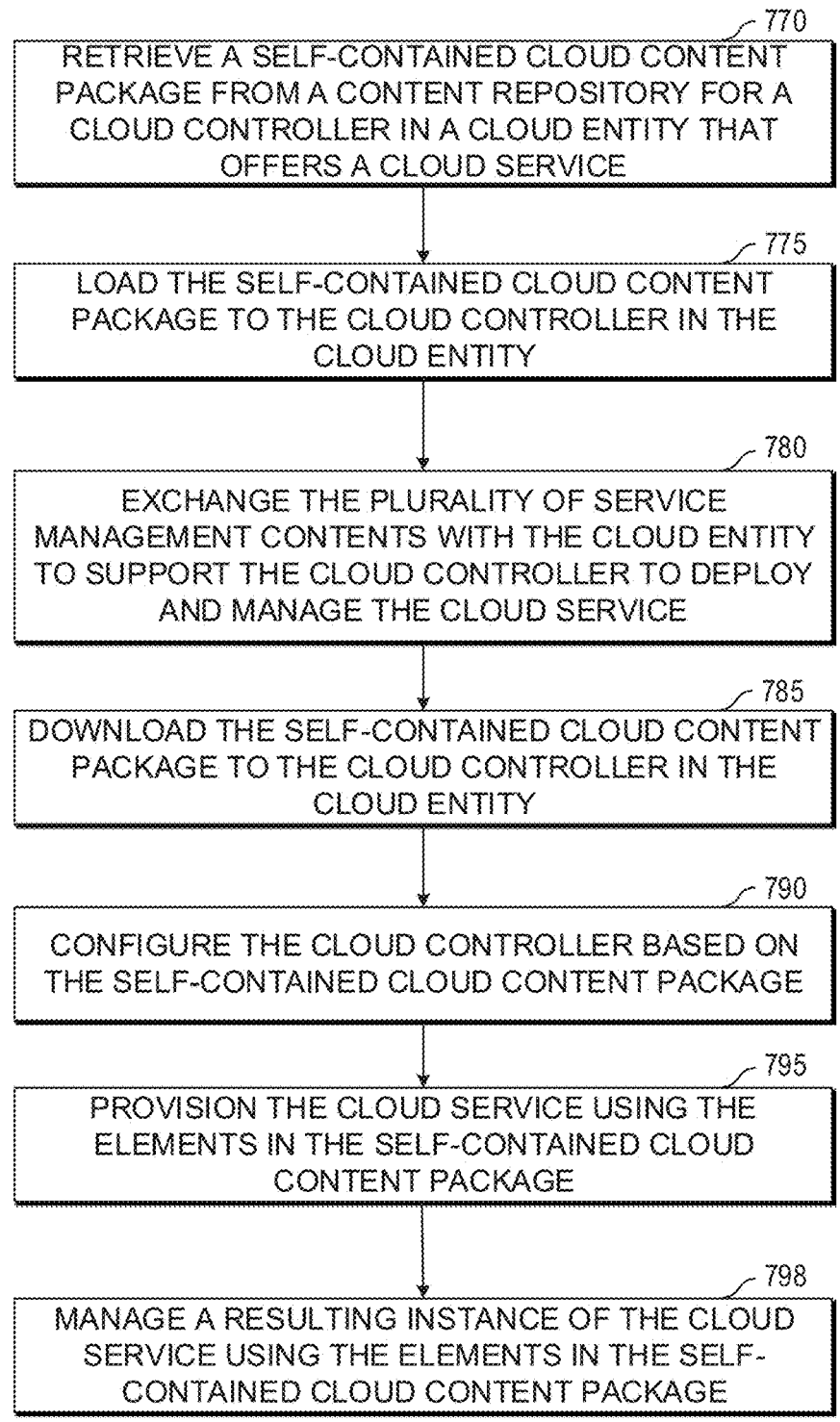

Processes to Exchange Service Management Contents with a Cloud Entity via a Self-Contained Cloud Content Package In discussing FIGS. 7A-7C, references may be made to the components in FIGS. 1-6 to provide contextual examples. In one implementation, cloud controller 100 described in FIG. 1 executes operations 700-785 to exchange a plurality of service contents with a cloud entity via a cloud content package. Further, although FIGS. 7A-7C are described as implemented by a computing device, it may be executed on other suitable devices or components. For example, FIGS. 7A-7C may be implemented in the form of executable instructions on a machine-readable storage medium 820 as in FIG. 8.

FIG. 7A is a flowchart of an example process to exchange a plurality of service management contents with a cloud entity via a self-contained cloud content package by a computing device. Here, the computing device can be a controller, a module of the controller, a controller cluster, or an external process. In addition, the computing device may include multiple devices that support the extracting, packaging, delivering, and loading in a cloud controller and/or repository in a cloud infrastructure. The computing device can be a cloud controller and/or a repository that belongs a cloud entity and/or a third party entity. In some examples, one cloud controller or repository may perform a subset of the functions, whereas another controller or repository may perform another subset of the functions. Likewise, some functions may be performed by the computing device associated with the cloud entity, whereas other functions may be performed by the computing device associated with the third party entity.

First, a computing device retrieves a plurality of service management contents for a first cloud controller that offers a cloud service (operation 700). Next, the computing device generates a self-contained cloud content package comprising the plurality of service management contents and a plurality of associated dependencies and configurations (operation 705). The plurality of service management contents includes a plurality of service designs and a plurality of provider configuration metadata associated with the plurality of service designs. The cloud content package here includes elements for provisioning and managing the cloud service offered by the first cloud controller. Further, the computing device may exchange the plurality of service management contents with a cloud entity to support a second cloud controller in the cloud entity to deploy and manage the cloud service (operation 710). In one example, the computing device can load the self-contained cloud content package to the second cloud controller in the cloud entity (operation 715). Then, the computing device can configure the second cloud controller in the cloud entity based on the self-contained cloud content package (operation 720). Also, the computing device can provision the cloud service using the elements in the cloud content package (operation 725). In addition, the computing device can manage a resulting instance of the cloud service using the elements in the self-contained cloud content package (operation 730).

FIG. 7B is a flowchart illustrating another example process to exchange a plurality of service management contents with a cloud entity via a self-contained cloud content package. Here, a computing device retrieves a plurality of service management contents for a first cloud controller that offers a cloud service (operation 735). Next, the computing device generates a self-contained cloud content package comprising the plurality of service management contents and a plurality of associated dependencies and configurations (operation 740). The plurality of service management contents includes a plurality of service designs and a plurality of provider configuration metadata associated with the plurality of service designs. The cloud content package here includes elements for provisioning and managing the cloud service offered by the first cloud controller. Further, the computing device may exchange the plurality of service management contents with a cloud entity to support a second controller in the cloud entity to deploy and manage the cloud service (operation 745). In one example, the computing device can upload the plurality of service management contents in the self-contained cloud content package to a market place to allow a second cloud controller in the cloud entity to obtain the plurality of service management contents (operation 750). Then, the computing device can configure the second cloud controller in the cloud entity based on the self-contained cloud content package (operation 755). Also, the computing device can provision the cloud service using the elements in the self-contained cloud content package (operation 760). In addition, the computing device can manage a resulting instance of the cloud service using the elements in the self-contained cloud content package (operation 765).

FIG. 7C is a flowchart illustrating another example process to exchange a plurality of service management contents with a cloud entity via a c self-contained loud content package. In this example, a computing device retrieves a self-contained cloud content package from a content repository for a cloud controller in a cloud entity that offers a cloud service (operation 770). Next, the network device loads the self-contained cloud content package to the cloud controller in the cloud entity (operation 775). Here, the cloud content package includes the plurality of service management contents and a plurality of associated dependencies and configurations. The plurality of service management contents includes a plurality of service designs and a plurality of provider configuration metadata associated with the plurality of service designs. The self-contained cloud content package here includes elements for provisioning and managing the cloud service offered by the cloud controller. Further, the computing device may exchange the plurality of service management contents with the cloud entity to support the cloud controller to deploy and manage the cloud service (operation 780). Moreover, the computing device can download the self-contained cloud content package to the cloud controller in the cloud entity (operation 785). Then, the computing device can configure the cloud entity based on the self-contained cloud content package (operation 790). Also, the computing device can provision the cloud service using the elements in the self-contained cloud content package (operation 795). Furthermore, the computing device can manage a resulting instance of the cloud service using the elements in the self-contained cloud content package (operation 798).

In some implementations, the cloud controller is configured with a cloud service automation platform for cloud service deployment, monitoring, and management.

In some implementations, the self-contained cloud content package comprises block of materials, settings, configurations, and artifacts to provision the cloud service by the cloud controller. Also, the self-contained cloud content package further includes tools, metadata and resources to manage the cloud service by the cloud controller after the cloud service is deployed.

In some implementations, the self-contained cloud content package further includes a plurality of service designs, a plurality of operations orchestration flows, a plurality of file system components, and a plurality of database components.

In some implementations, the plurality of dependencies includes a plurality of platform dependencies and a plurality of resource provider dependencies. Moreover, the plurality of platform dependencies includes a cloud controller version (e.g., a HPE CSA version, an operations orchestration (OO) version, etc.) and a product version associated with a product involved in provisioning or managing the cloud service. The plurality of resource provider dependencies may include a resource provider version, a design version, and a version of the plurality of service management contents associated with the product.

In some implementations, to generate the self-contained cloud content package, the computing device can package a definition of the self-contained cloud content package into an instance of a cloud content capsule. Then, the computing device can test the instance of the cloud content capsule, and transmit the instance of the cloud content capsule to a content depot.

In some examples, the second cloud controller may be associated with a different configuration for deploying and managing the plurality of service management contents. In some examples, the elements for provisioning and managing the cloud service offered by the first cloud controller is self-contained such that the same elements are used to provision and manage the second cloud controller.

In some examples, the first cloud controller is associated with a service provider, and the second cloud controller is associated with a reseller having a different configuration for deploying and managing the plurality of service management contents. In some examples, the first cloud controller is associated with a cloud software developer, an independent software vendor (ISV), or a service provider (SP). The second cloud controller may be associated with a service provider aggregator that aggregates a plurality of services associated with a plurality of cloud content packages and offers the plurality of services to a plurality of resellers.

Figure 8:
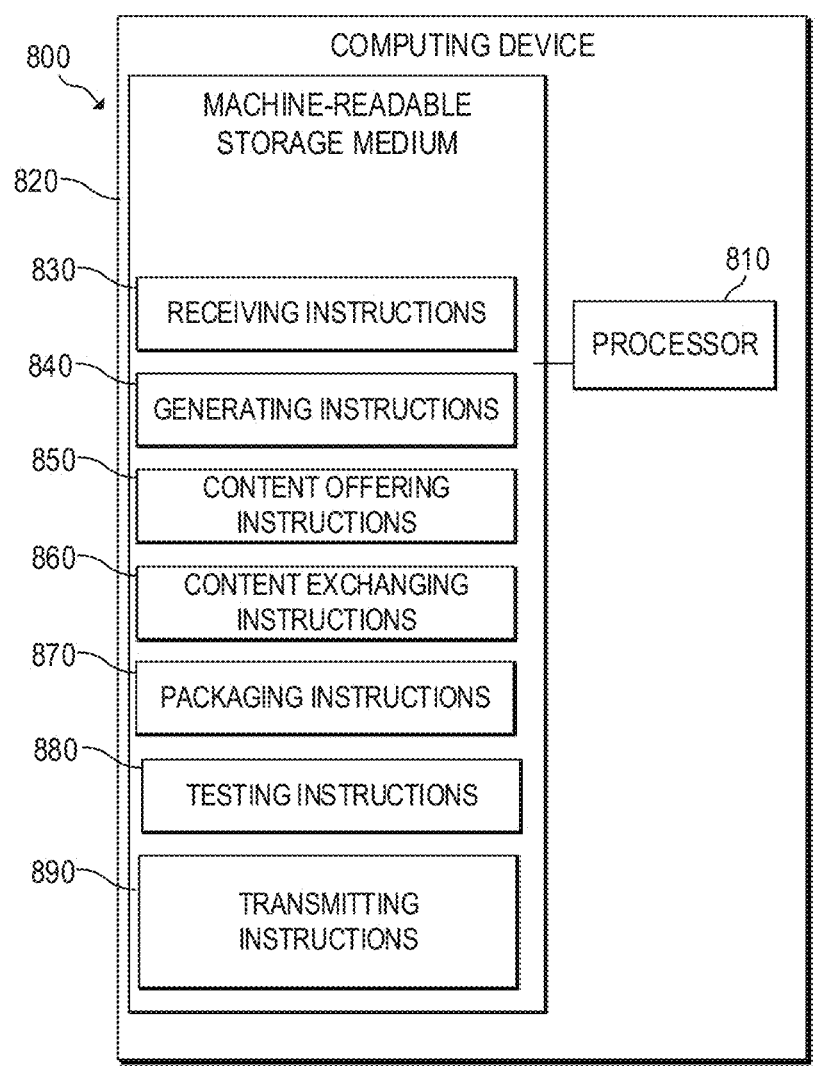
FIG. 8 is a block diagram of an example network device to exchange a plurality of service management contents with a cloud entity via a self-contained cloud content package.

Computing Device to Exchange Service Management Contents with a Cloud Entity Via a Self-Contained Cloud Content Package FIG. 8 is a block diagram of an example computing device with at least one processor 810 to execute instructions 830-890 within a machine-readable storage medium 820 to exchange service management contents with a cloud entity via a cloud content package. Although computing device 800 includes at least one processor 810 and machine-readable storage medium 820, it may also include other components that would be suitable to one skilled in the art. For example, computing device 800 may include an additional processing component and/or storage. In another implementation, the network device executes instructions including but not limited to receiving instructions 830, generating instructions 840, content offering instructions 850, content exchanging instructions 860, packaging instructions 870, testing instruction 880, and transmitting instructions 890.

Computing device 800 may be an electronic device with the at least one processor 810 capable of executing instructions 830-890, and as such implementations of computing device 800 include a mobile device, server, data center, networking device, service provider device, aggregator device, reseller device, computer, or any other type of electronic device capable of executing instructions 830-890. The instructions 830-890 may be implemented as methods, functions, operations, and other processes implemented as machine-readable instructions stored on the storage medium 820, which may be non-transitory, such as hardware storage devices (e.g., random access memory (RAM), read only memory (ROM), erasable programmable ROM, electrically erasable ROM, hard drives, and flash memory).

The at least one processor 810 may fetch, decode, and execute instructions 830-890 to exchange service contents with a cloud entity via a self-contained cloud content package. Specifically, the at least one processor 810 executes instructions 830-890 to: retrieve a plurality of service management contents for a cloud controller that offers a cloud service; generate a self-contained cloud content package comprising the plurality of service management contents and a plurality of associated dependencies and configurations, wherein the self-contained cloud content package includes elements for provisioning and managing the cloud service offered by the cloud controller; exchange the plurality of service management contents with a cloud entity via a self-contained cloud content package to support deployment of the cloud service to the cloud entity; load the self-contained cloud content package to the cloud entity; upload the plurality of service management contents in the self-contained cloud content package to a market place to allow the cloud entity to obtain the plurality of service management contents; allow a second cloud controller associated with the cloud entity to download the self-contained cloud content package; configure the cloud entity based on the self-contained cloud content package; provision the cloud service using the elements in the self-contained cloud content package; manage a resulting instance of cloud service using the elements in the self-contained cloud content package; package a definition of the cloud content package into an instance of a cloud content capsule; test the instance of the cloud content capsule; transmit the instance of the cloud content capsule to a content depot; etc.

The machine-readable storage medium 820 includes instructions 830-890 for the processor 810 to fetch, decode, and execute. In another example, the machine-readable storage medium 820 may be an electronic, magnetic, optical, memory, storage, flash-drive, or other physical device that contains or stores executable instructions. Thus, the machine-readable storage medium 820 may include, for example, Random Access Memory (RAM), an Electrically Erasable Programmable Read-Only Memory (EEPROM), a storage drive, a memory cache, network storage, a Compact Disc Read Only Memory (CDROM) and the like. As such, the machine-readable storage medium 820 may include an application and/or firmware which can be utilized independently and/or in conjunction with the at least one processor 810 to fetch, decode, and/or execute instructions of the machine-readable storage medium 820. The application and/or firmware may be stored on the machine-readable storage medium 820 and/or stored on another location of the computing device 800.

We claim:

1. A method comprising:
    retrieving, by a computing device, a plurality of service management contents for a first cloud controller that is to provision and manage a cloud service;
    generating, by the computing device, a self-contained cloud content package comprising the plurality of service management contents and a plurality of associated dependencies and configurations, wherein the self-contained cloud content package includes elements for provisioning and managing the cloud service by the first cloud controller;
    exchanging, by the computing device, the plurality of service management contents with a cloud entity to support a second cloud controller in the cloud entity to deploy and manage the cloud service, the exchanging comprising:
        loading the self-contained cloud content package to the second cloud controller in the cloud entity, the second cloud controller having a configuration different from a configuration of the first cloud controller, and
        configuring, using the self-contained cloud content package including the elements for provisioning and managing the cloud service by the first cloud controller, the second cloud controller in the cloud entity to consume the plurality of service management contents based on the associated dependencies in the self-contained cloud content package, the configuring of the second cloud controller to enable the second cloud controller to provision and manage the cloud service using the elements in the self-contained cloud content package.

2. The method of claim 1, wherein the self-contained cloud content package comprises a block of materials, settings, and artifacts to provision the cloud service by the second cloud controller, and wherein the self-contained cloud content package further comprises tools, metadata, and resources to manage the cloud service by the second cloud controller after the cloud service is deployed.

3. The method of claim 1, wherein the self-contained cloud content package further comprises a plurality of service designs, a plurality of operations orchestration flows, a plurality of file system components, and a plurality of database components.

4. The method of claim 1, wherein the plurality of associated dependencies comprises a plurality of platform dependencies and a plurality of resource provider dependencies.

5. The method of claim 4, wherein the plurality of platform dependencies comprises a cloud controller version, and a product version associated with a product involved in at least one of provisioning the cloud service and managing the cloud service.

6. The method of claim 5, wherein the plurality of resource provider dependencies comprises: a design version, a resource provider version, and a version of the plurality of service management contents associated with the product.

7. The method of claim 1, wherein the plurality of service management contents comprises a plurality of service designs and a plurality of provider configuration metadata associated with the plurality of service designs.

8. The method of claim 1, further comprising:
    packaging, by the computing device, a definition of the self-contained cloud content package into an instance of a cloud content capsule; and
    testing, by the computing device, the instance of the cloud content capsule, wherein the exchanging of the plurality of service management contents with the cloud entity further comprises transmitting the instance of the cloud content capsule to a content depot.

9. The method of claim 1, wherein both the first cloud controller and the second cloud controller are associated with the cloud entity.

10. The method of claim 1, wherein the first cloud controller is associated with a service provider, and wherein the second cloud controller is associated with a reseller, the second cloud controller having the configuration different from the configuration of the first cloud controller for deploying and managing the plurality of service management contents.

11. The method of claim 1, wherein the first cloud controller is associated with one of a software developer, an independent software vendor (ISV), or a service provider (SP), and wherein the second cloud controller is associated with a service provider aggregator that aggregates a plurality of services associated with a plurality of cloud content packages and offers the plurality of services to a plurality of resellers.

12. A computing system comprising at least a memory and a processor coupled to the memory, the processor to execute instructions stored in the memory to:
    retrieve a plurality of service management contents for a first cloud controller that is to provision and manage a cloud service;
    generate a self-contained cloud content package comprising the plurality of service management contents and a plurality of associated dependencies, wherein the self-contained cloud content package includes elements for provisioning and managing the cloud service by the first cloud controller;
    uploading the plurality of service management contents in the self-contained cloud content package to a second cloud controller in a cloud entity, wherein a configuration of the second cloud controller is different from a configuration of the first cloud controller; and
    configuring, using the self-contained cloud content package including the elements for provisioning and managing the cloud service by the first cloud controller, the second cloud controller in the cloud entity to consume the plurality of service management contents based on the associated dependencies in the self-contained cloud content package, the configuring of the second cloud controller to enable the second cloud controller to provision and manage the cloud service using the elements in the self-contained cloud content package.

13. The computing system of claim 12, wherein the self-contained cloud content package comprises a block of materials, settings, configurations, and artifacts to provision the cloud service by the second cloud controller, and wherein the self-contained cloud content package further comprises tools, metadata, and resources to manage the cloud service by the second cloud controller after the cloud service is deployed.

14. The computing system of claim 12, wherein the self-contained cloud content package further comprises a plurality of service designs, a plurality of operations orchestration flows, a plurality of file system components, and a plurality of database components.

15. The computing system of claim 12, wherein the plurality of associated dependencies comprises a plurality of platform dependencies and a plurality of resource provider dependencies, wherein the plurality of platform dependencies comprises a cloud controller version, a product version associated with a product involved in provisioning and managing the cloud service, and wherein the plurality of resource provider dependencies comprises a resource provider version, a design version, and a version of the plurality of service management contents associated with the product.

16. The computing system of claim 12, wherein the plurality of service management contents comprises a plurality of service designs and a plurality of provider configuration metadata associated with the plurality of service designs.

17. The computing system of claim 12, wherein the processor is to execute instructions stored in the memory further to:
   package a definition of the self-contained cloud content package into an instance of a cloud content capsule;
   test the instance of the cloud content capsule; and
   transmit the instance of the cloud content capsule to a content depot.

18. The computing system of claim 12, wherein the elements for provisioning and managing the cloud service offered by the first cloud controller are self-contained such that the elements contribute to provisioning and managing of the cloud service by the second cloud controller.

19. A non-transitory machine-readable storage medium comprising instructions executable by at least one processor of a computing system, the machine-readable storage medium comprising instructions to:
   retrieve a self-contained cloud content package from a content repository for a first cloud controller that is to provision and manage a cloud service, wherein the self-contained cloud content package comprises a plurality of service management contents and a plurality of associated dependencies and configurations;
   load the self-contained cloud content package to the first cloud controller, wherein the self-contained cloud content package includes elements for provisioning and managing the cloud service by the first cloud controller;
   load the self-contained cloud content package to a second cloud controller in a cloud entity, the second cloud controller having a configuration different from a configuration of the first cloud controller;
   configuring, using the self-contained cloud content package including the elements for provisioning and managing the cloud service by the first cloud controller, the second cloud controller in the cloud entity to consume the plurality of service management contents based on the associated dependencies in the self-contained cloud content package, wherein without the associated dependencies in the self-contained cloud content package the second cloud controller would be unable to consume the plurality of service management contents in the self-contained cloud content package, the configuring of the second cloud controller to enable the second cloud controller to provision and manage the cloud service using the elements in the self-contained cloud content package.

20. The non-transitory machine-readable storage medium of claim 19, wherein the configuration of the second cloud controller that is different from the configuration of the first cloud controller causes the first and second cloud controllers to consume the plurality of service management contents differently.

* * * * *